United States Patent
Williams et al.

[11] Patent Number: 5,882,050
[45] Date of Patent: Mar. 16, 1999

[54] FERRULE WITH RELIEF TO REDUCE GALLING

[76] Inventors: Peter C. Williams, 3495 Edison Rd., Cleveland Hts., Ohio 44121; David A. McMillan, 6083 Stone Rd., Streetsboro, Ohio 44240; Howard C. B. Kuhns, 1194 Lloyd Ave., Aurora, Ohio 44202

[21] Appl. No.: 834,255

[22] Filed: Apr. 15, 1997

[51] Int. Cl.⁶ .............................. F16L 19/06; F16L 19/08
[52] U.S. Cl. ...................... 285/343; 285/382.7; 285/348
[58] Field of Search ................................ 285/382.7, 342, 285/343, 341, 348

[56] References Cited

U.S. PATENT DOCUMENTS

| | | |
|---|---|---|
| 388,522 | 8/1888 | Beauchemin . |
| 1,323,705 | 12/1919 | Lynch . |
| 2,150,042 | 3/1939 | Shultz ..................................... 285/166 |
| 2,179,127 | 11/1939 | Lauer . |
| 2,182,811 | 12/1939 | Kocher ................................... 285/123 |
| 2,330,841 | 10/1943 | Parker . |
| 2,405,822 | 8/1946 | Franck ..................................... 285/90 |
| 2,463,707 | 3/1949 | Matousek ................................. 285/341 |
| 2,641,487 | 6/1953 | LaMarre .................................. 285/122 |
| 2,687,315 | 8/1954 | Courtot .................................. 285/382.7 |
| 2,701,149 | 2/1955 | Kreidel et al. ......................... 285/382.7 |
| 2,738,994 | 3/1956 | Kreidel et al. ........................... 285/122 |
| 2,744,651 | 5/1956 | Bredtschneider ........................ 220/46 |
| 2,749,152 | 6/1956 | Courtot . |
| 3,103,373 | 9/1963 | Lennon et al. ........................... 285/342 |
| 3,120,969 | 2/1964 | Schmohl .................................. 285/341 |
| 3,215,457 | 11/1965 | Teeters ..................................... 285/341 |
| 3,250,550 | 5/1966 | Lyon .......................................... 285/3 |
| 3,275,350 | 9/1966 | Kody et al. ............................... 285/341 |
| 3,290,069 | 12/1966 | Davis .................................. 285/382.7 |
| 3,321,947 | 5/1967 | Teeters ....................................... 72/377 |
| 3,336,058 | 8/1967 | Franck ................................. 285/382.7 |
| 3,433,508 | 3/1969 | Teeters ..................................... 285/341 |
| 3,445,128 | 5/1969 | Teeters ..................................... 285/341 |
| 3,484,123 | 12/1969 | Van Der Velden . |
| 3,695,647 | 10/1972 | Pugliese .................................. 285/341 |
| 3,707,302 | 12/1972 | Hiszpanski . |
| 3,888,522 | 6/1975 | Moreiras .............................. 285/382.7 |
| 4,076,286 | 2/1978 | Spontelli ................................. 285/341 |
| 4,230,349 | 10/1980 | Normark ................................. 285/342 |
| 4,235,461 | 11/1980 | Normark ................................. 285/340 |
| 4,630,851 | 12/1986 | Ogawa ..................................... 285/341 |
| 4,826,218 | 5/1989 | Zahuranec ............................... 285/342 |
| 4,915,427 | 4/1990 | Zahuranec ............................... 285/342 |
| 5,217,261 | 6/1993 | DeWitt et al. ......................... 285/332.2 |
| 5,351,998 | 10/1994 | Behrens et al. ...................... 285/382.7 |
| 5,482,332 | 1/1996 | Ohmi et al. ............................. 285/328 |

FOREIGN PATENT DOCUMENTS

| | | | |
|---|---|---|---|
| 489289 | 4/1992 | European Pat. Off. ............ | 285/382.7 |
| 757204 | 12/1933 | France . | |
| 1092160 | 4/1955 | France ................................ | 285/382.7 |
| 4041679 | 6/1992 | Germany ........................... | 285/382.7 |
| 6710340 | of 1966 | Netherlands . | |
| 598530 | 4/1978 | Switzerland ........................ | 285/382.7 |
| 836002 | 6/1960 | United Kingdom ................ | 285/382.7 |
| 2032555 | 5/1980 | United Kingdom ................ | 285/382.7 |
| 2080900 | 2/1982 | United Kingdom ................ | 285/382.7 |
| 89/09904 | 10/1989 | WIPO ................................. | 285/382.7 |

*Primary Examiner*—Eric K. Nicholson
*Attorney, Agent, or Firm*—Calfee, Halter & Griswold LLP

[57] ABSTRACT

High localized loading, galling, and high torque forces have been generally eliminated or greatly reduced in a two ferrule tube fitting assembly through suitable modification of the rear ferrule so as to redirect the reaction forces acting between the front ferrule and the drive nut. The rear ferrule has a cylindrical interior wall that closely surrounds the tube end and is provided on the interior cylindrical wall with a circumferentially continuous radial recess that is located between the nose and rear wall of the rear ferrule. The rear ferrule also has a radially external wall that is substantially conical and additionally shaped to extend radially outward toward the enlarged diameter portion or flange of the rear ferrule.

20 Claims, 12 Drawing Sheets

| VARIATIONS | TEAR DROP | RIGHT TRIANGLE | RECTANGLE | OVAL | SQUARE | CIRCULAR | OBTUSE TRIANGLE | CURVE | COMPOUND CURVE |
|---|---|---|---|---|---|---|---|---|---|
| STANDARD LOCATION | | | | | | | | | |
| FORWARD LOCATION | | | | | | | | | |
| REARWARD LOCATION | | | | | | | | | |
| REVERSE DIRECTION | | | X | X | X | X | | | X |
| MULTIPLE SHAPES | | | X | X | X | X | | | X |
| REVERSE MULTIPLE SHAPES | | | X | X | X | X | | | X |
| ENLARGED SINGLE SHAPE | | | | | | | | | |
| ENLARGED MULTIPLE SHAPES | | | | | | | | | X |

FIG. 14

FERRULE WITH RELIEF TO REDUCE GALLING

BACKGROUND OF THE INVENTION

The subject invention is directed to the art of ferrule type tube fittings. More particularly, the invention concerns a two ferrule fitting wherein the rear ferrule is designed to reduce the torque required to rotate the associated nut and to also reduce galling between the rear ferrule and the interior surface of the drive nut.

Figure 1:
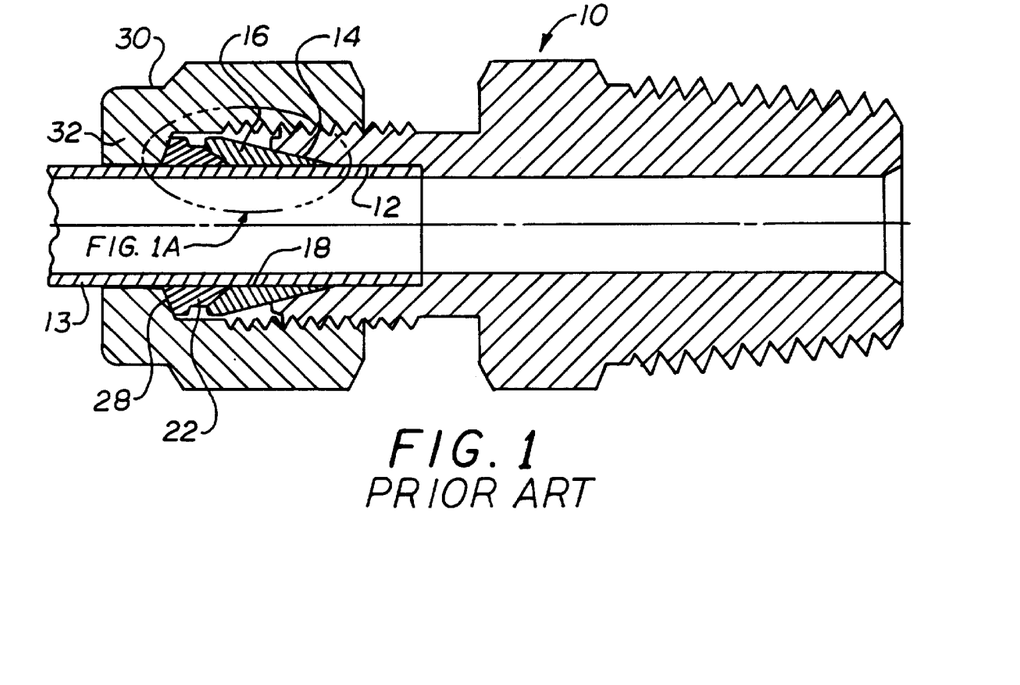
FIG. 1 is a longitudinal cross-sectional view of a well known prior art two ferrule swage-type fitting.
Figure 1A:
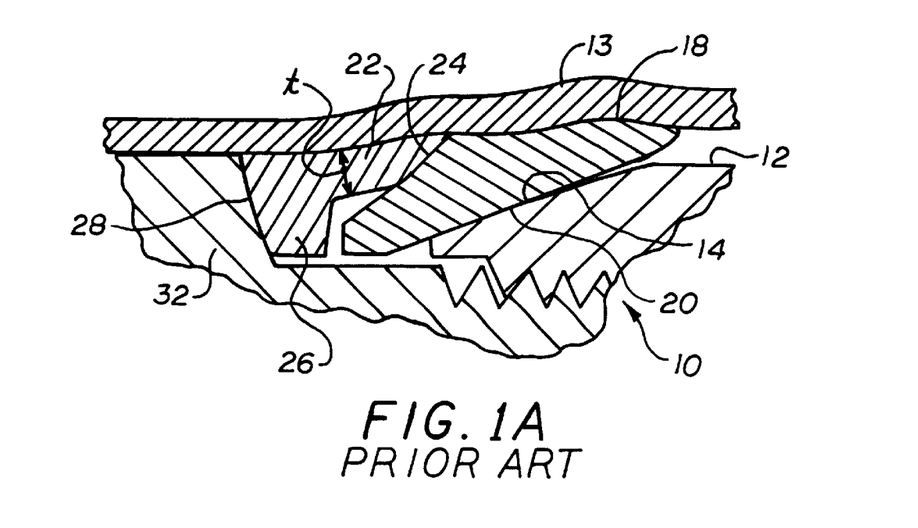
FIG. 1A is an enlarged view of the circled area of FIG. 1 showing the prior art fitting in a made-up condition.

A commercially available and highly successful two ferrule fitting used for tubing is illustrated in FIGS. 1 and 1A. FIG. 1 shows the fitting components in a finger tight position preparatory to final tightening, whereas FIG. 1A shows the fitting after final tightening. As shown, the fitting comprises a body 10 having a cylindrical opening 12 counterbored for receiving tube end 13. A tapered, frusto-conical camming mouth 14 is located at the axial outer end of the counterbore. A front ferrule 16 having a smooth, cylindrical inner wall 18 is closely received on the tube. The front ferrule has a frusto-conical outer surface 20 to be received in the camming mouth.

Associated with the front ferrule 16 and located axially outward therefrom is a rear ferrule 22 configured as shown with a tapered nose portion 24 and a rear flange 26 having an inclined end surface 28. The tapered nose enters a tapered camming surface in the rear surface of the front ferrule.

The ferrules 16, 22 are enclosed by a drive nut member 30 threaded to the body. During tightening and make-up of the fitting, the inner end face, flange, or shoulder 32 of the nut acts against the rear wall of the rear ferrule to drive the ferrules forwardly into the fully engaged position shown in FIG. 1A.

The small diameter portion or nose of the rear ferrule is dimensioned so that it plastically deforms during make-up of the fitting. This action is desirable since it results in tight gripping engagement of the outer wall of the tubing. The thickness of the nose portion cannot be reduced to an extent that the rear ferrule deforms too much and only the rear ferrule adequately grips the outer wall of the tubing. That is, the two ferrule assembly requires desired deformation of both the front and rear ferrules for the gripping and sealing capabilities that have made this two ferrule assembly a commercially successful product. On the other hand, the thickness of the nose of the rear ferrule cannot be enlarged to such an extent that it results in a structural arrangement that is too stiff and does not permit the desired rear ferrule deformation.

Accordingly, it will be recognized by those skilled in the art that a predetermined wall thickness of the nose of the rear ferrule is desired that achieves the desired gripping of the tube and cooperates with the front ferrule in such a manner that it achieves its desired goals of gripping and sealing the tube.

It is also recognized that operators of fluid systems test the system prior to a production run by pressurizing the system to an appropriate factor times the rated system pressure. In this manner, the operator can easily detect whether the fluid system is sealed, i.e. that there are no leaks. With this knowledge, the manufacturer can provide a fitting in which the nose of the rear ferrule will not have any additional plastic deformation at the elevated test pressure. Accordingly, the elevated test pressure is used to determine the desired wall thickness of the nose portion of the rear ferrule to achieve the desired amount of deformation of the nose and permit the front and rear ferrules to properly grip and seal with the outer wall of the tube.

It has also been found that galling of the drive nut sometimes occurs in the drive face area of engagement between the inner end face of the nut and the rear wall of the rear ferrule. After analysis, it is believed that the axial thrust between the front and rear ferrule is essentially parallel to the axis of the fitting. This axial thrust causes the rear corner region of the rear ferrule to selectively concentrate at the inside drive surface of the nut in a localized area to produce the galling. This also noticeably increases the nut torque forces experienced during make-up even if galling is absent. Accordingly, it would be highly desirable to provide a design wherein the thrust forces do not produce the high localized loading with the resultant galling and high torque forces.

SUMMARY OF THE INVENTION

In accordance with the subject invention, the high localized loading, galling, and high torque forces have been generally eliminated or greatly reduced through suitable modification of the rear ferrule so as to redirect the reaction forces acting between the front ferrule and the drive nut.

In particular, and in accordance with the subject invention, the rear ferrule has a cylindrical interior wall that closely surrounds the tube end and is provided on the interior cylindrical wall with a circumferentially continuous radial recess that is located between the nose and rear wall of the rear ferrule.

In accordance with another aspect of the invention, a tube fitting of the general type is provided wherein the rear ferrule has a radially external wall that is substantially conical and additionally shaped to extend radially outward toward the enlarged diameter portion or flange of the rear ferrule.

Both the radial recess and the conical wall feature of the nose portion in the rear ferrule cause those reaction forces generated during fitting make-up and passing from the front ferrule through the rear ferrule to the nut to take on a more uniform distribution across the inner face of the nut to thereby reduce any concentration of force acting axially against the inner face of the nut member.

It has been found that the conical shape of the radially external wall and the recess provided on the cylindrical interior wall of the ferrule can have a variety of different configurations. The actual shape and configuration of this circumferentially continuous recess can be determined through experimentation or analysis in line with the parameters and general objectives outlined in the Background. Preferably, however, the recess has a length that is at least about five percent (5%) of the total overall axial length of the rear ferrule. In addition, it has been found desirable to provide the ferrule with a radial extent that is at least about five percent (5%) of the radial extent of the rear wall of the rear ferrule.

By careful design of the radially external wall and the recess relative to the remainder of the rear ferrule, the reaction forces are shifted so as to have a greater radial component. This achieves a more uniform distribution and prevents highly localized loading anywhere at the rear face of the rear ferrule and the inner wall of the nut member acting against the rear ferrule. Because the reaction forces are redirected in this manner, there is, of course, less concentration and a reduction in both galling and torque requirements during fitting make-up.

As can be seen from the foregoing, the primary object of the invention is the provision of a two ferrule fitting wherein galling between the nut and the force receiving surface of the rear ferrule is greatly reduced.

Yet another object of the invention is the provision of a two ferrule fitting assembly which uses a modified rear ferrule that results in lower torque requirements on fitting make-up.

Yet another object is the provision of a fitting of the general type described wherein the ferrules and the nut member are arranged to produce a more desirable force distribution with improved cooperation between the nut and the rear ferrule.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE PREFERRED EMBODIMENTS

Figure 2:
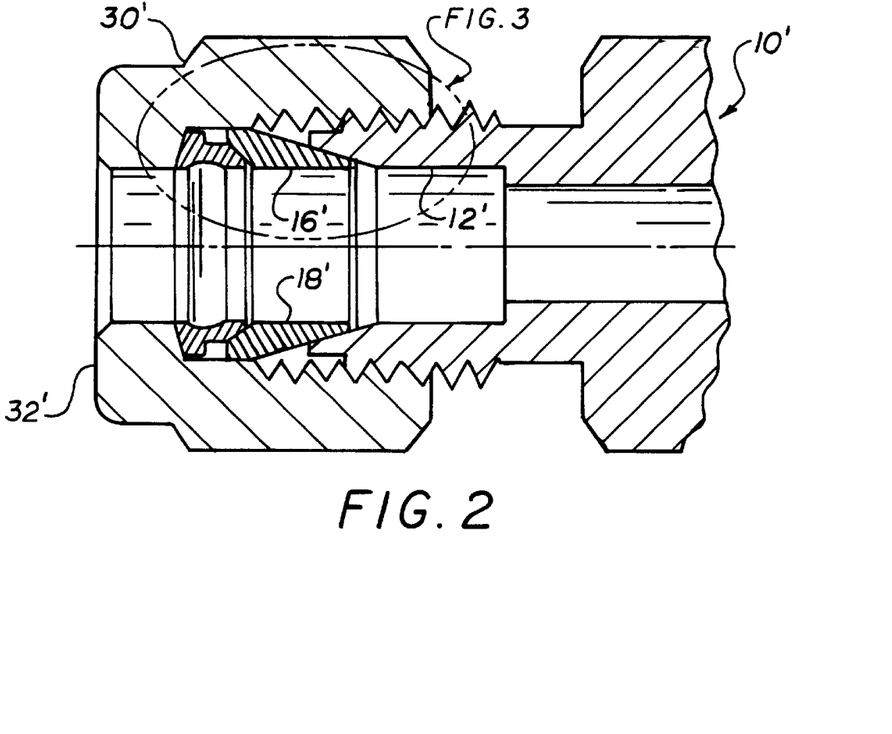
FIG. 2 is a view like FIG. 1 but showing a preferred embodiment of a fitting incorporating a modified rear ferrule designed to improve reaction force transmission through the rear ferrule.
Figure 3:
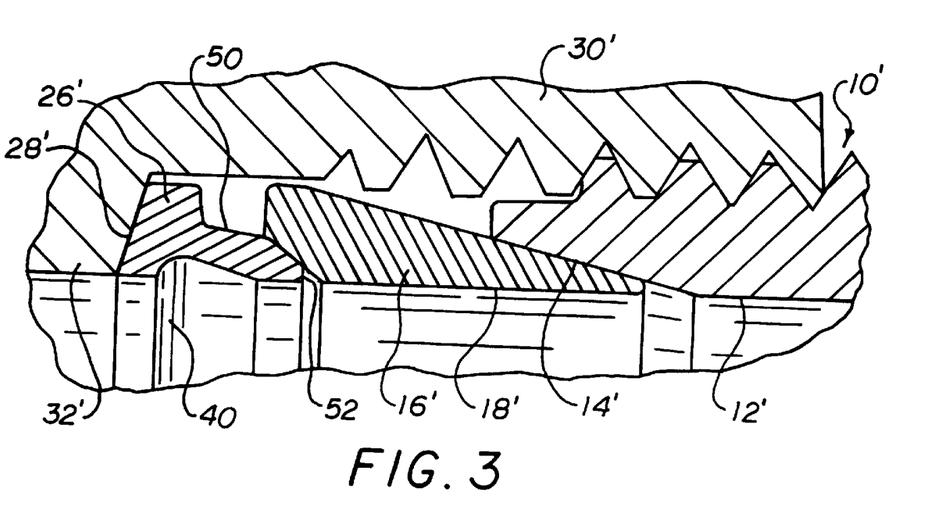
FIG. 3 is a greatly enlarged showing of the circled area of FIG. 2.
Figure 4:
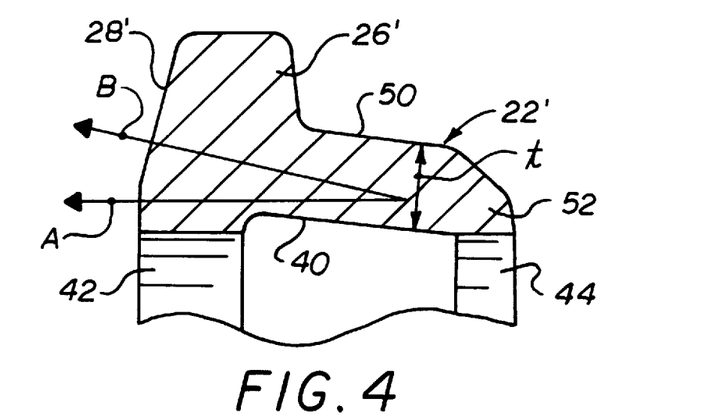
FIG. 4 is a detailed, partial cross-sectional view of a preferred form of rear ferrule.

Referring now to the drawings wherein the showings are for the purposes of illustrating preferred embodiments of the invention only and not for purposes of limiting same, FIGS. 2–4 illustrate the overall arrangement of a fitting incorporating the invention. The FIGS. 2–4 embodiment has the major components identified with the same reference numerals used with respect to the description of the prior art device of FIGS. 1 and 1A. A description of a FIG. 1 element is to be taken as equally applicable to the FIGS. 2–4 elements that are correspondingly numbered unless otherwise noted. In particular, in the FIGS. 2–4 embodiment, the rear ferrule 22' has been modified in a manner to cause the reaction forces acting between the front ferrule through the rear ferrule to the nut to have a significant force component that is directed radially outward. This is in contradistinction to the FIGS. 1 and 1A embodiment wherein the force component under consideration has a high axial component. Specifically, as shown in FIG. 4, force component A extends generally axially of the rear ferrule 22' and results in an increase in the loads applied at the radial inner face of the ferrule surface 28' and the flange 32' of the nut. As previously discussed, high localized loading or force concentration in this area produces high torque and galling.

In the preferred form of the invention, a redirection of the reaction forces is achieved by providing a circumferential recess 40 throughout the inner surface of the ferrule 22'. Note that a recess 40 is located generally midway between the opposite ends of the ferrule 22' and this results in the inner surface of the rear ferrule being reduced to two relatively narrow contact areas 42 and 44. By so modifying the rear ferrule, the forces which are conducted from the front ferrule through the rear ferrule to the nut surface or flange 32' tend to be directed more radially outward such as diagrammatically illustrated by the force line B of FIG. 4.

Another important feature of the invention is best exemplified by comparing the rear ferrule of FIG. 1 with the rear ferrule of the FIGS. 2–4 embodiment. Particularly, the outer radial wall 50 of the rear ferrule includes a conical section that increases in radial dimension as it extends from the forward nose portion, that is received in the rear chamfer region 52 of the front ferrule, to the rear flange 26'. In the prior art arrangement (FIGS. 1 and 1A), the rear ferrule has a cylindrical throughbore and an outer radial wall that extends parallel to the inner surface defining the throughbore in this region. In other words, the rear ferrule has a constant annular wall thickness "t". In the embodiment of FIGS. 2–4, the outer wall has the conical or tapered configuration that provides sufficient wall thickness "t" and controlled deformation of the nose portion when the recess is incorporated into the modified rear ferrule. Preferably, the outer wall 50 has a generally uniform angle or taper as it extends between the reduced dimension nose region 52 received in the camming mouth of the front ferrule and the enlarged diameter rear flange 26'. Again, this provides controlled deformation of the rear ferrule so that the region 52 is plastically deformed radially inward along surface 44 into gripping, sealed engagement with the outer wall of the tube.

Figure 5:
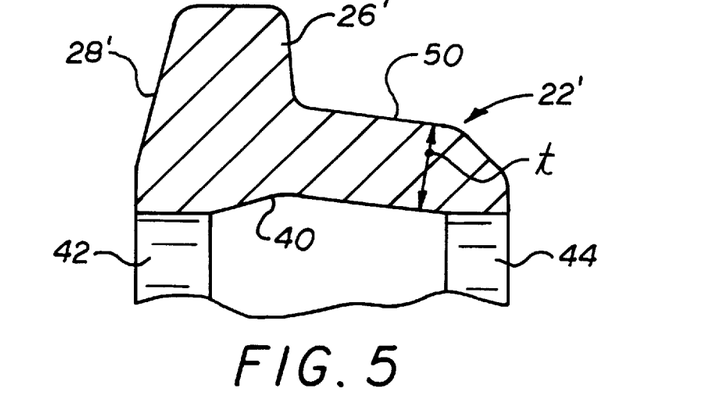
FIG. 5 is a cross-sectional view similar to FIG. 4 showing a second preferred form for the rear ferrule.

FIG. 5 illustrates another preferred embodiment of the rear ferrule in which the recess 40 has is defined by two different angles (an obtuse triangle). For example, the smaller first angle defined with the inner surface increases as it extends rearwardly from the surface 44 toward the rear flange 26'. The larger second angle (approximately twice the angular dimension of the first angle) increases as it extends forwardly from the surface 42 toward the nose region. These angles thus intersect at an axial position that is located beneath the intersection of the outer wall 50 with the rear flange. Accordingly, the forces are more evenly distributed over the rear face 28'.

Figure 6:
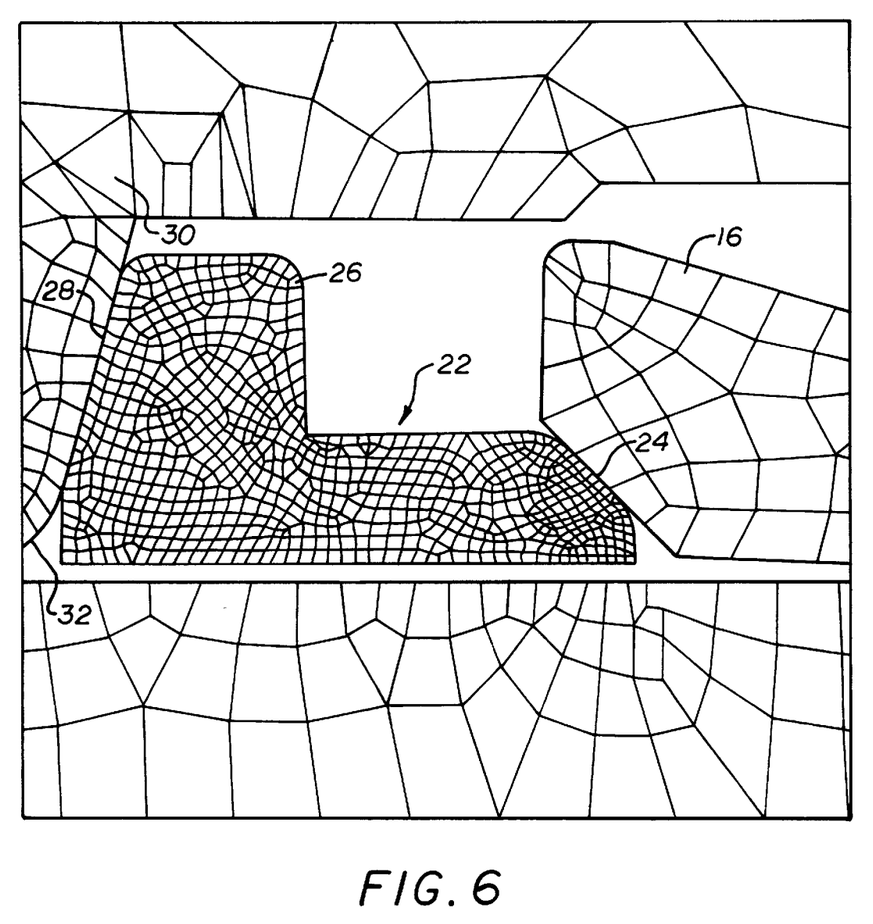
FIG. 6 is a cross-sectional view of the fitting of FIG. 1 particularly showing the rear ferrule positioned between the front ferrule and the nut at initial make-up.
Figure 7:
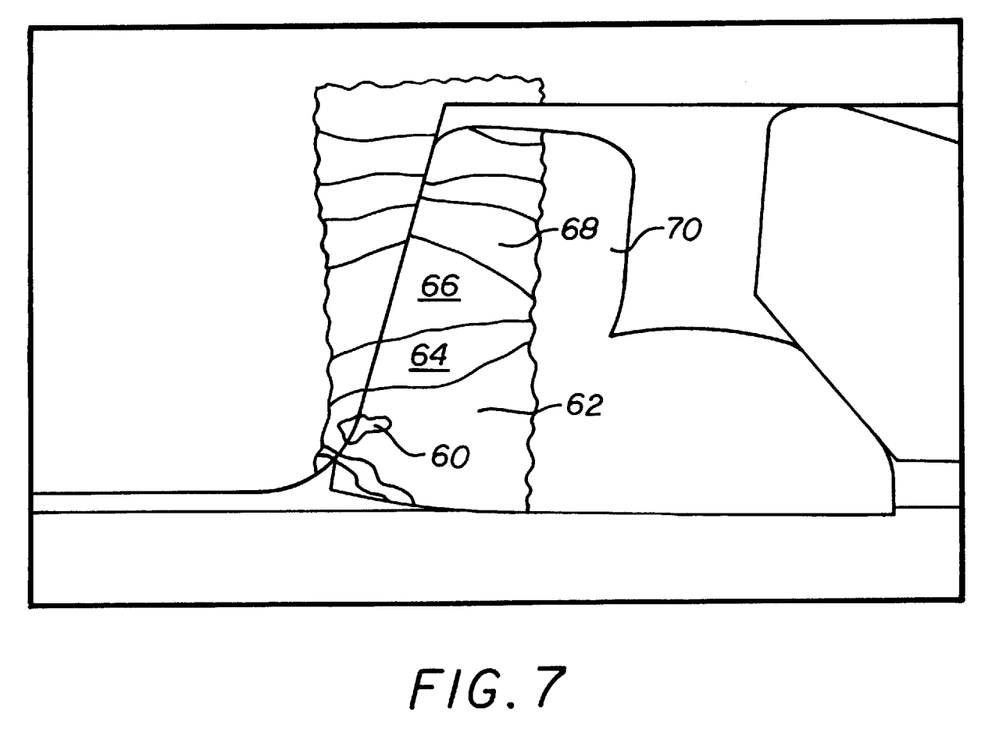
FIG. 7 is a view of the fitting of FIG. 6 in a made-up condition and illustrating the force concentrations.

Turning to FIGS. 6 and 7, the rear ferrule of the prior art arrangement of FIG. 1 is shown before and after make-up of the fitting. The fitting was subjected to a finite element analysis, the results of which are particularly evident in FIG. 7. There, shaded regions in the rear flange of the rear ferrule and the nut evidence the force and stress concentrations encountered upon make-up of the fitting. Particularly, a region of high stress concentration is designated at area 60. Regions of progressively decreased stress concentration are identified by numerals 62, 64, 66, 68, and 70. Thus, the large stress concentration at the radial inner location of the rear face 28' results in increased torque during make-up and potential galling of the nut.

Figure 8:
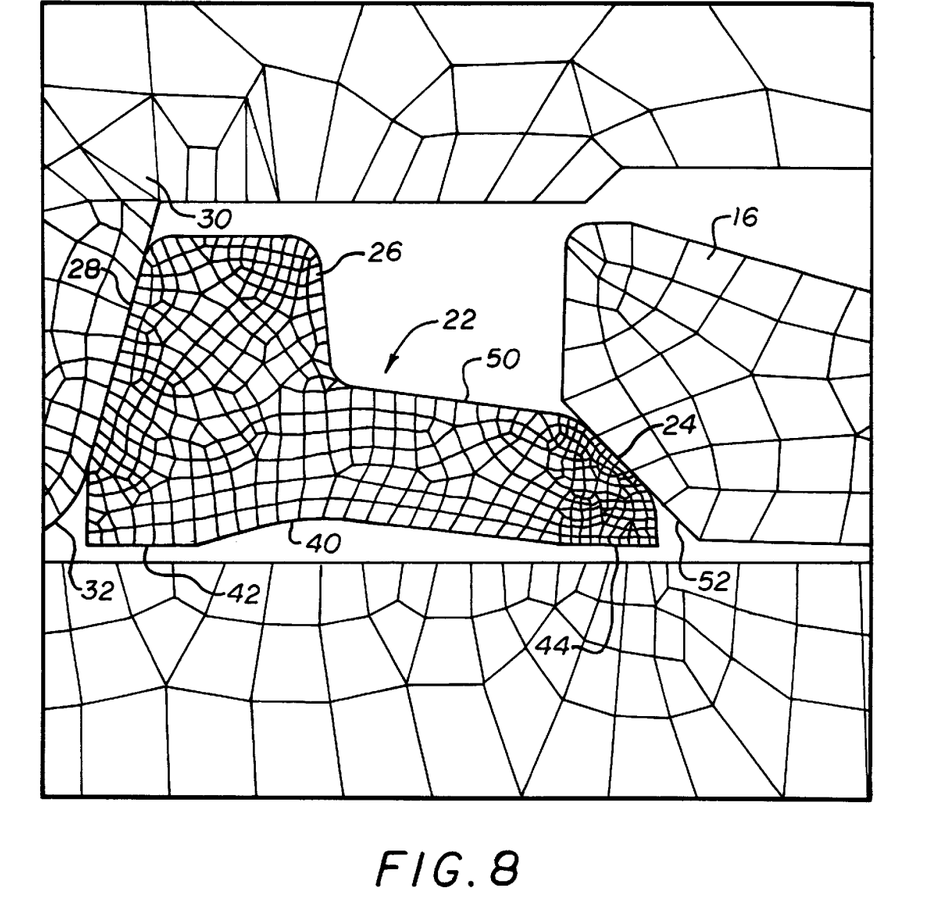
FIG. 8 is a cross-sectional view of a fitting at initial make-up including a rear ferrule modified in accordance with the teachings of the invention.
Figure 9:
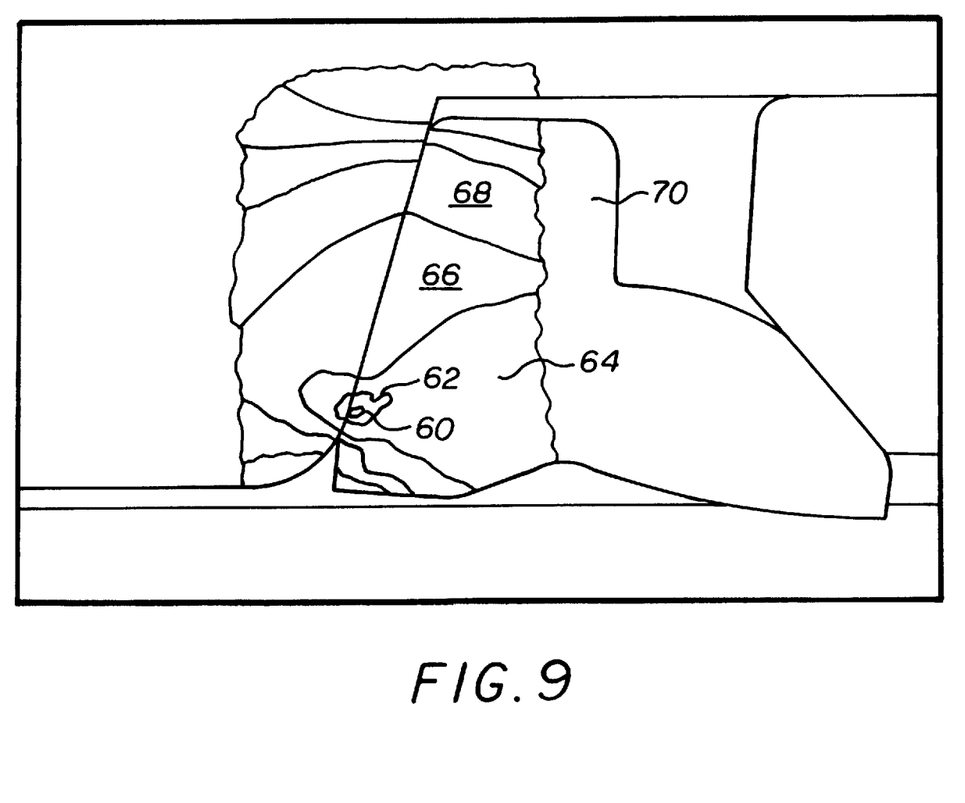
FIG. 9 is a view of the fitting of FIG. 8 in a made-up condition and illustrating the force concentrations.

FIGS. 8 and 9 show another modified rear ferrule in accordance with the teachings of the present invention. This rear ferrule is the same as shown in FIG. 5. As particularly evident in FIG. 9, the region of high stress concentration is substantially reduced in size when compared to FIG. 7. This indicates that the forces have been more uniformly dispersed over the rear face of the flange of the rear ferrule. Thus, the torque is reduced and the potential for galling is likewise reduced.

Figure 10:
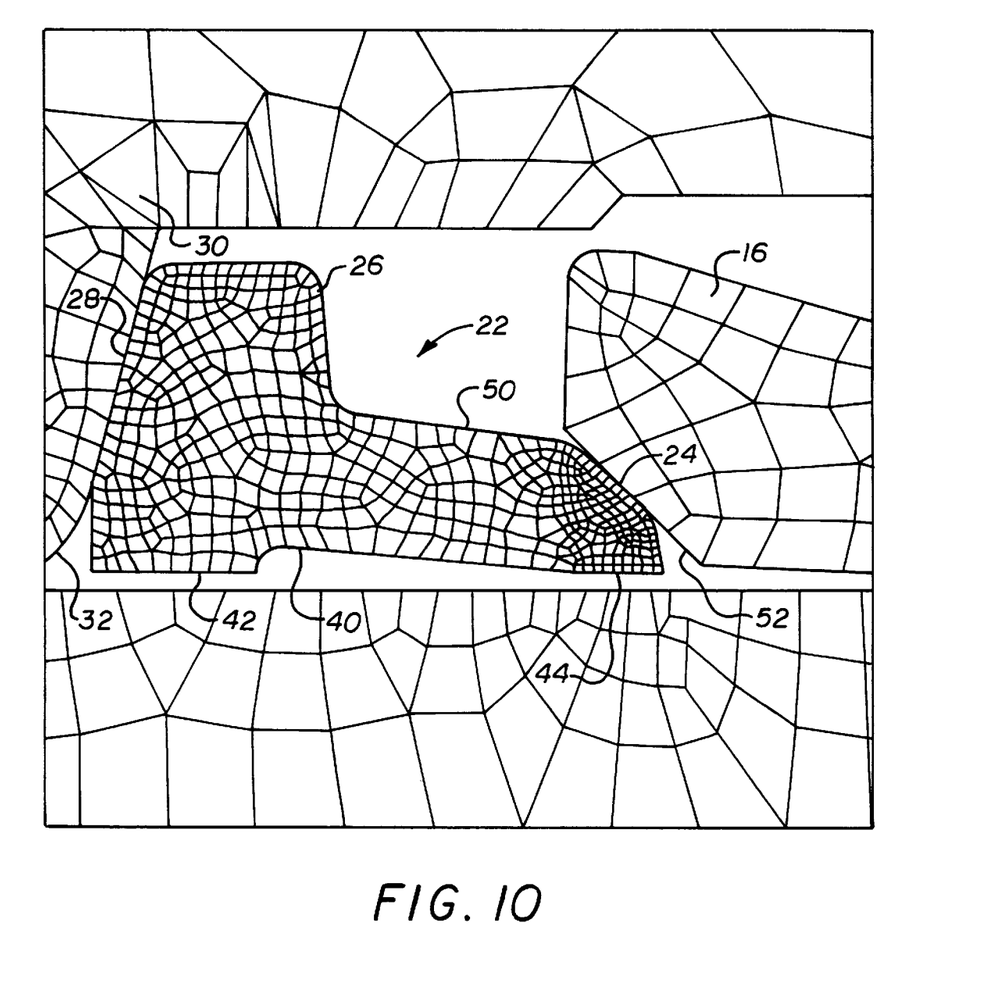
FIG. 10 is a cross-sectional view of a fitting at initial make-up including a rear ferrule modified in accordance with the teachings of the invention.
Figure 11:
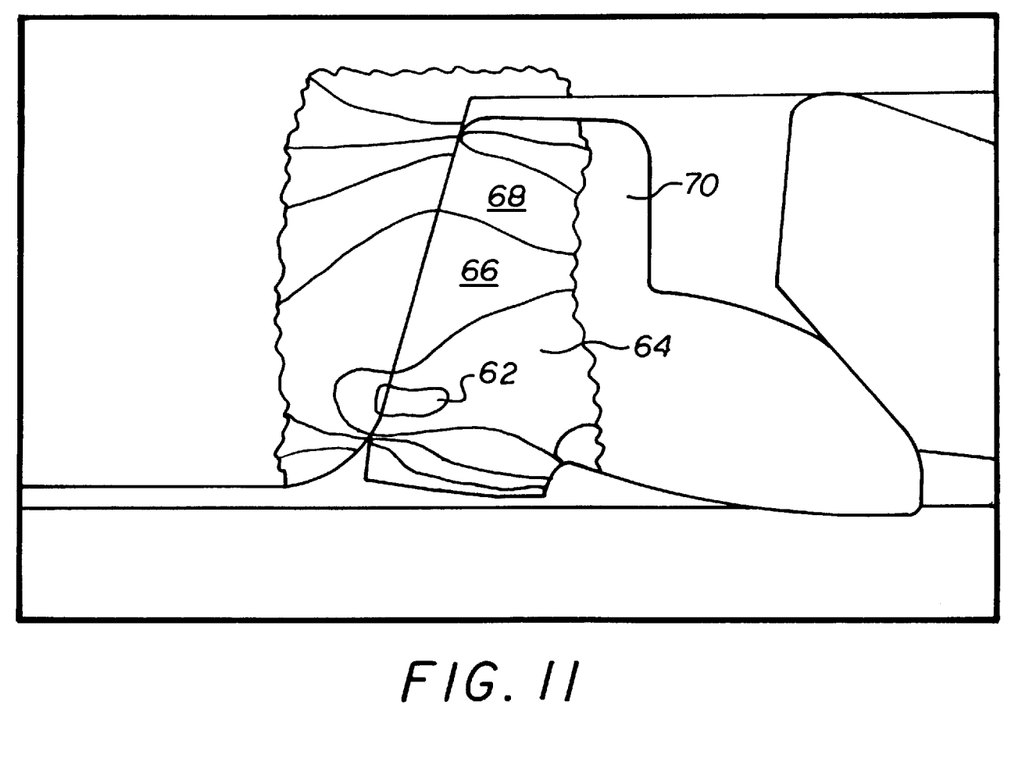
FIG. 11 is a view of the fitting of FIG. 10 in a made-up condition and illustrating the force concentrations.

FIGS. 10 and 11 represent the rear ferrule shown and described in FIG. 4. Here, the finite element analysis illustrates that the region of high stress concentration is substantially removed at the rear face and a more uniform distribution of forces obtained. Again, the torque forces associated with make-up are thus reduced with the corresponding reduction in localized force concentrations. The recess and conical outer wall provide a radial component to the forces generated in the fitting and transferred through the rear ferrule while still providing a desired gripping and sealing of the tube.

Figure 12:
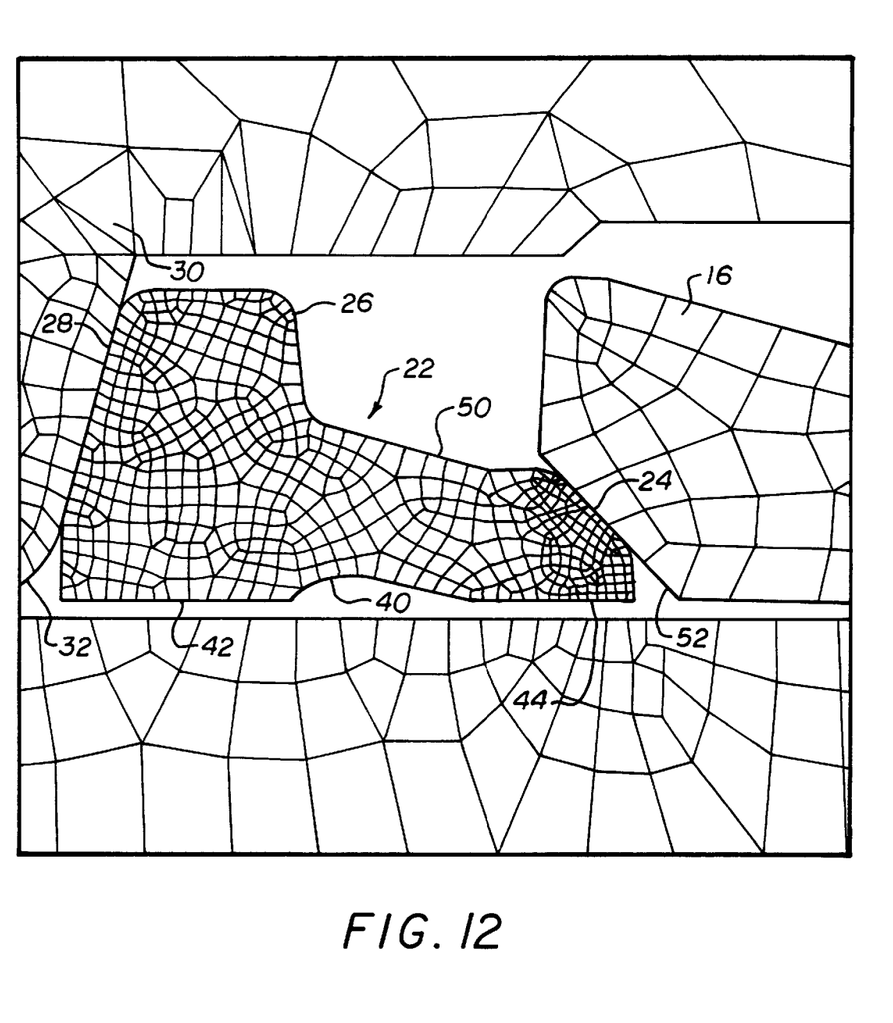
FIG. 12 is a cross-sectional view of a fitting at initial make-up including a rear ferrule modified in accordance with the teachings of the invention.
Figure 13:
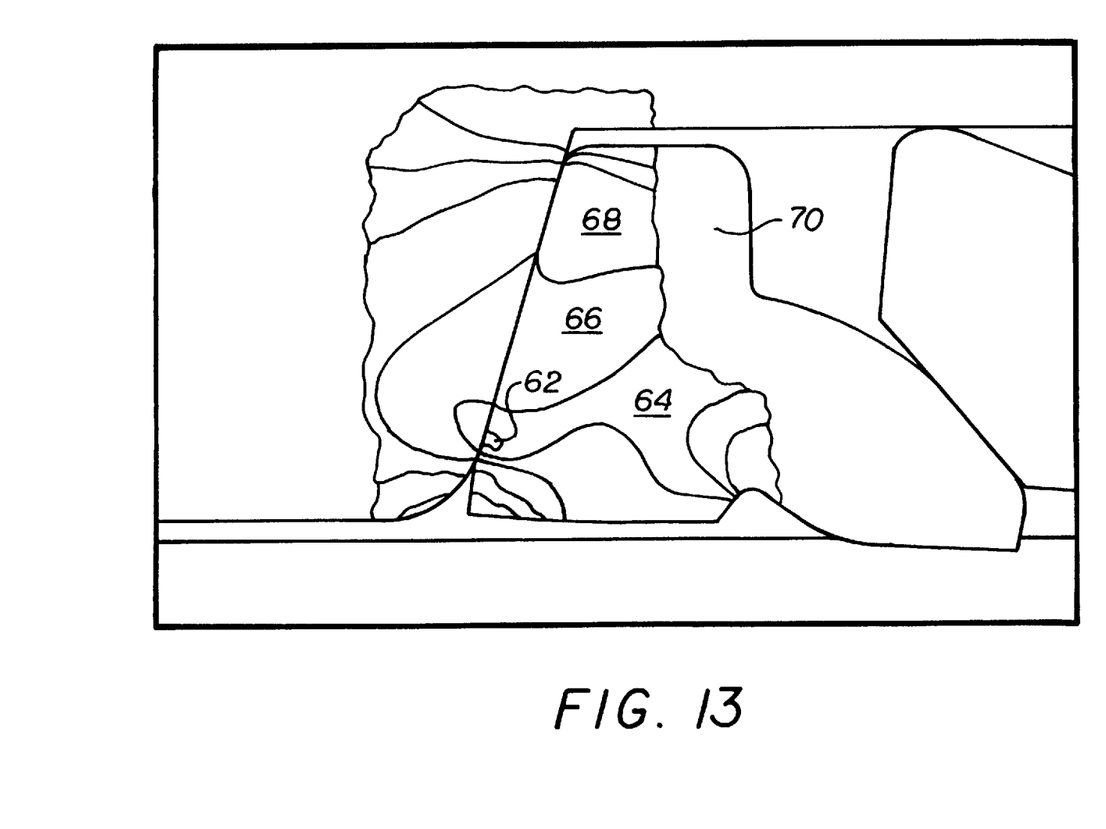
FIG. 13 is a view of the fitting of FIG. 12 in a made-up condition and illustrating the force concentrations.

The embodiment of FIGS. 12 and 13 also achieves these same objectives. The recess is of a slightly different configuration, i.e., the recess is more sharply defined in the inner wall of the rear ferrule. It is also shifted slightly forwardly so that the deepest portion of the recess is located forwardly of the rear flange. However, the outer wall is still of conical configuration and in conjunction with the recess distributes the forces along the rear face of the rear ferrule.

Figure 14:
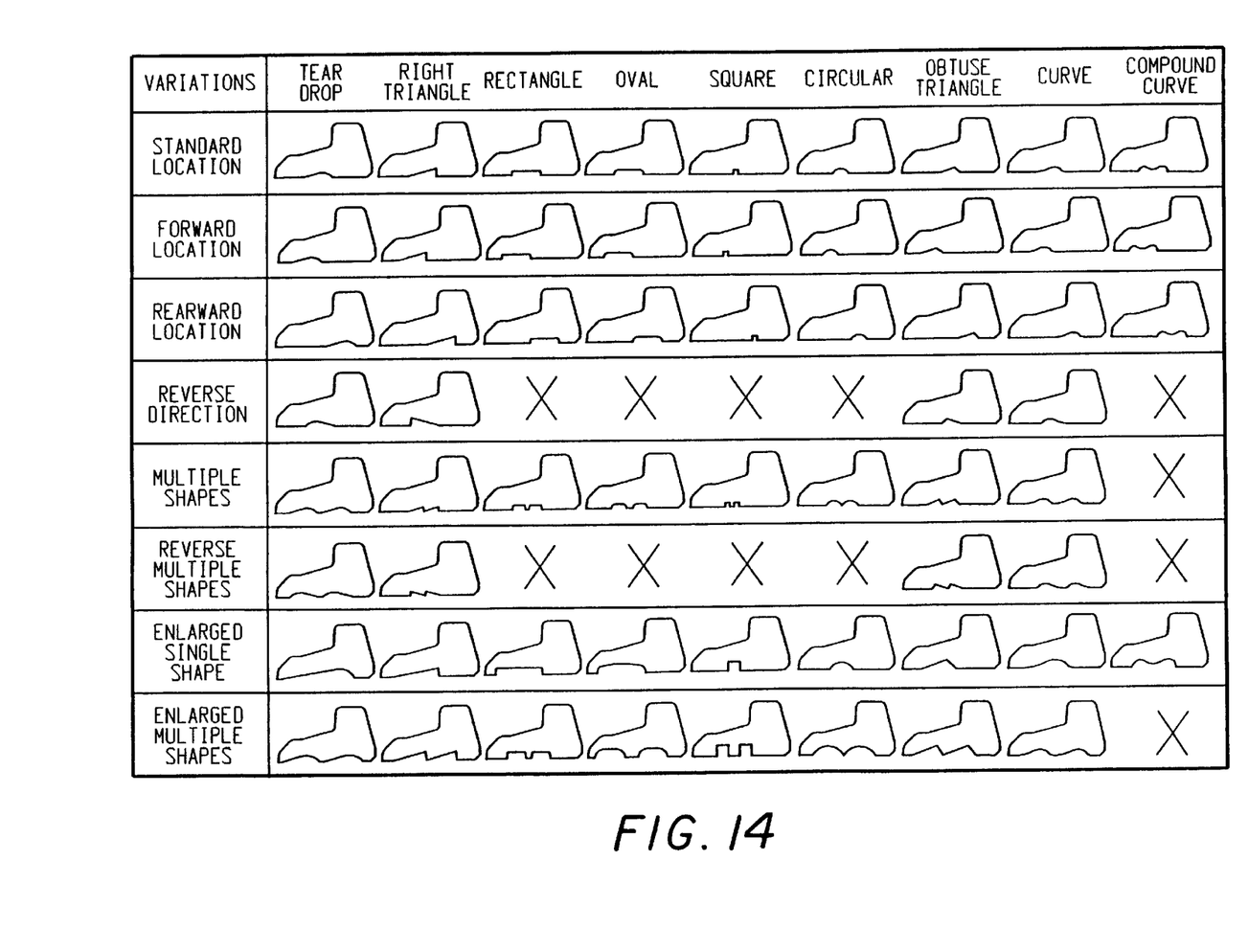
FIG. 14 is a table of different geometrical variations of the rear ferrule configuration.

As is apparent with the various embodiments described above, the recess and the tapered outer wall do not require a particular conformation to achieve the force distribution and reduced torque for make-up of the fitting. In fact, a number of proposed alternative embodiments are illustrated in table form in FIG. 14. For example, the first row of geometries have a standard location that is generally defined as the rear edge of the recess being located axially beneath the intersection of the outer wall and the enlarged flange. The tear drop, right triangle, rectangle, oval, square circular, obtuse triangle, curve, and compound curve are various shapes that the recess may adopt. Moreover, the recess can be positioned at a forward location (second row), or a rearward location where the deepest portion of the recess is positioned beneath the enlarged flange (third row) while still adopting the various configurations. Still further, the orientation of the shapes can be reversed as demonstrated by the various geometries in the fourth row or the sixth row, or the recess may be defined by multiple recesses as shown in the geometries of the fifth and eighth rows. Alternatively, the recess(es) may be enlarged as indicated in the seventh and eighth rows. Accordingly, the invention is not limited to the particular configurations shown and described in the earlier embodiments of FIGS. 2–13, but may also be incorporated into selected other geometrical configurations.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a tube fitting of the type including a fitting body having a cylindrical bore closely receiving a tube end, a tapered counterbore surrounding the tube end and defining the entrance to the bore, a nut member threaded to the fitting body and cooperating with the fitting body to define a chamber enclosing the tube end, a front ferrule surrounding the tube end with a tapered nose extending into the tapered counterbore and a rear wall located axially outward, a rear ferrule having a rear wall engaged by an axial inner end wall of the nut member and a tapered nose extending into a tapered recess formed in the rear wall of the front ferrule, the improvement wherein the rear ferrule has a substantially continuous cylindrical interior wall that closely surrounds the tube end and extends from its rear wall to its tapered nose with the cylindrical interior wall having a circumferentially continuous radial recess located between the rear ferrule's nose and rear wall and axially spaced from said rear ferrule's nose to cause reaction forces generated during fitting make-up and passing from the front ferrule through the rear ferrule to the nut to have a significant force component that is directed radially outward to thereby reduce a force component acting axially against the radial inner portion of the inner end wall of the nut member.

2. The improvement as defined in claim 1 wherein the radial recess increases in radial depth as one progresses axially from adjacent the nose of the rear ferrule toward the rear wall of the rear ferrule.

3. The improvement as defined in claim 1 wherein the rear wall of the rear ferrule is slightly inclined toward the nose of the rear ferrule.

4. The improvement as defined in claim 1 wherein the rear ferrule includes a radially extending flange that defines the rear wall of the rear ferrule.

5. The improvement as defined in claim 4 wherein the radially extending flange has a forward face located rearwardly of the nose portion of the rear ferrule and spaced from the rear wall of the front ferrule when the nose of the rear ferrule is fully inserted into the tapered recess formed in the rear wall of the front ferrule.

6. The improvement as defined in claim 1 wherein the rear ferrule has a tapering outer wall between the nose portion and the rear wall for directing forces radially outward.

7. The improvement as defined in claim 1 wherein said circumferentially continuous radial recess has an axial length of approximately five percent minimum of the total axial length of the rear ferrule.

8. The improvement as defined in claim 1 wherein said circumferentially continuous radial recess in said rear ferrule includes first and second axially spaced recesses.

9. The improvement as defined in claim 1 wherein the rear ferrule includes a radially extending flange that defines the rear wall of the rear ferrule, the recess being located at substantially the same axial position as the flange.

10. The improvement as defined in claim 1 wherein the rear ferrule includes a radially extending flange that defines the rear wall of the rear ferrule, and a tapering outer wall between the nose portion and the flange for directing forces radially outward.

11. The improvement as defined in claim 10 wherein the tapering outer wall increases in the radial direction as it extends from the nose portion toward the flange.

12. In a tube fitting of the type including a fitting body having a cylindrical bore closely receiving a tube end, a tapered counterbore surrounding the tube end and defining the entrance to the bore, a nut member threaded to the fitting body and cooperating with the fitting body to define a chamber enclosing the tube end, a ferrule having a rear wall engaged by an axial inner end wall of the nut member and a tapered nose extending into said tapered counterbore the improvement wherein the ferrule has a substantially continuous cylindrical interior wall that closely surrounds the tube end and extends from its rear wall to its tapered nose with the cylindrical interior wall having a circumferentially continuous radial recess located between the rear ferrule's nose and rear wall and axially spaced from said rear ferrule's nose, to cause reaction forces generated during fitting make-up and passing through the ferrule to the nut to have a significant force component that is directed radially outward to thereby reduce a force component acting axially against the radial inner portion of the inner end wall of the nut member.

13. The improvement as defined in claim 12 wherein the recess is disposed at substantially the same axial location as the flange.

14. The improvement as defined in claim 12 wherein the recess is defined by first and second axially spaced recesses.

15. The improvement as defined in claim 12 wherein the recess is located radially inward of the tapering outer wall.

16. The improvement of claim 12 wherein said reaction forces are substantially normal to and directed into said rear wall of said ferrule to substantially prevent the rear portion of the rear ferrule from being directed into the tube.

17. The improvement of claim 12 wherein said ferrule comprises a tapering outer wall portion disposed between the rear wall and the nose of the ferrule.

18. The improvement of claim 1 wherein said substantially continuous cylindrical interior wall extend axially from said tapered nose towards said rear wall.

19. The improvement of claim 1 wherein said significant force component that is directed radially outward substantially prevents the rear portion of said rear ferrule from being directed into the tube, said rear portion of said rear ferrule being that portion axially closest to the nut member.

20. The improvement of claim 1 wherein said recess divides said substantially continuous cylindrical surface into two or more segments.

* * * * *